US005724516A

United States Patent [19]
Temoshenko

[11] Patent Number: 5,724,516
[45] Date of Patent: Mar. 3, 1998

[54] SYSTEM FOR DYNAMICALLY CREATING AND RETRIEVING FORMATTED DUMP DATA BY SETTING VALUE IN DUMP OBJECT INDICATING THAT THE DUMP AGENT IS TO GENERATE FORMATTED DUMP DATA

[75] Inventor: Leo Temoshenko, Raleigh, N.C.

[73] Assignee: International Business Machines Corporation, Armonk, N.Y.

[21] Appl. No.: 524,280

[22] Filed: Sep. 6, 1995

[51] Int. Cl.$^6$ .................................................. G06F 17/30
[52] U.S. Cl. ................................ 395/200.32; 395/200.48
[58] Field of Search ........................... 371/15.1; 395/427, 395/575, 600, 200.32, 200.48

[56] References Cited

U.S. PATENT DOCUMENTS

| 5,019,961 | 5/1991 | Addesso et al. ................ 364/192 |
| 5,111,384 | 5/1992 | Aslanian et al. ................ 395/575 |
| 5,123,017 | 6/1992 | Simpkins et al. ............... 371/15.1 |
| 5,140,687 | 8/1992 | Dye et al. ....................... 395/500 |
| 5,197,005 | 3/1993 | Shwartz et al. ................. 364/419 |
| 5,274,679 | 12/1993 | Abe et al. ...................... 375/117 |
| 5,335,341 | 8/1994 | Chana ............................. 395/575 |
| 5,495,607 | 2/1996 | Pisello et al. .................. 395/600 |
| 5,546,577 | 8/1996 | Marlin et al. .................. 395/600 |
| 5,555,389 | 9/1996 | Satoh et al. .................... 395/427 |

FOREIGN PATENT DOCUMENTS

| 0529787A2 | 3/1993 | European Pat. Off. . |
| 0576410A2 | 12/1993 | European Pat. Off. . |
| 0586767A1 | 3/1994 | European Pat. Off. . |

Primary Examiner—Thomas C. Lee
Assistant Examiner—David Ton
Attorney, Agent, or Firm—John J. Timar; Felsman, Bradley, Gunter & Dillon, LLP

[57] ABSTRACT

A method of selectively obtaining formatted dump data from a remote software product employs an open Manager-Agent concept, where the Agent is represented by the remote software product and the Manager is represented by the local customer/vendor management station. A dump object is defined; this object exists at the Agent and is exposed to Manager for modification, e.g., specification of a value. Modification of the dump object by the Manager will cause the Agent to selectively create/store a formatted storage dump for one or more of software products components. The Manager retrieves the formatted dump data from the Agent using a standard/open file transfer mechanism; since the dump data is formatted at the Agent (rather than by the receiver, i.e., manager) the problem of transmitting large amounts of data across a network is minimized or eliminated. This method is product- and product-level independent; since the Manager and Agent interactions do not involve product-specific logic, it can be used to selectively obtain formatted dump data from any software product, and, since the formatting is done by the Agent, there is no problem in matching the level of the format routine to the product level. The Manager-Agent interactions are network management protocol independent, and may use a standard such as SNMP.

10 Claims, 3 Drawing Sheets

5,724,516

SYSTEM FOR DYNAMICALLY CREATING AND RETRIEVING FORMATTED DUMP DATA BY SETTING VALUE IN DUMP OBJECT INDICATING THAT THE DUMP AGENT IS TO GENERATE FORMATTED DUMP DATA

BACKGROUND OF THE INVENTION

1. Technical Field

This invention relates to computer networks, and more particularly to a method for managing a network to obtain formatted dump data from a remote software product.

2. Description of the Related Art

One of the important functions needed when installing and maintaining a software product is problem determination. If a problem is encountered in the installation or use of the product, certain information about the problem (i.e., what exactly happened) is needed by the manager or troubleshooter so that the problem can be corrected. And, software vendors or designers often need dumps of their product's internal data structures to resolve suspected problems in the product's execution. The request to provide such detailed internal information is often passed on to the customers of the software product whenever they wish to report a problem to the software vendor. That is, a vendor asks the customer to produce a dump of certain data structures whenever the customer requests aid from the vendor in maintaining or correcting problems with the software.

The method herein disclosed is specifically addressed to the problem of selectively obtaining formatted dump data from a software product executing in a remote or different location from that of the customer or product vendor.

Traditionally the function of obtaining formatted dump data for a product executing in a remote location involves executing a series of product-specific steps. These prior methods were product-specific in that functions were written into the code of the product itself, and were unique to that product. Typically, these product-specific steps included logging on to the remote product/box, issuing some proprietary command to obtain a complete product dump, transferring the complete product dump across a network and then locally (at the manager's site) executing a proprietary dump format program against the entire product dump.

A variety of problems existed with the traditional methodology of obtaining formatted dump data from a remote product. First, the prior methods were not universal, i.e., could not be used with a wide scope of different product type; the concept of an open Manager-Agent relationship did not exist; the remote log-on dump command, the transfer mechanism and the format program were completely product-specific and proprietary. Second, the successful execution of the traditional methodologies was made difficult due to the size of the dump, the quality/speed of the network, and the necessity for selection of the correct format program for the actual product level; in some situations, the process could take days to complete and, in others, might have been impossible to complete. Third, the dump processing could not be repeated quickly or easily on the remote box due to the inherent resource limits of disk space and network bandwidth; oftentimes, a problem could not be captured in the first dump attempt, and the process would need to be repeated quickly and without disruption (restart) of the product, yet this repeat would not be possible. Fourth, the customer/vendor usually would not have a convenient way of producing a selective or "component only" dump from the remote product. Fifth, the dump processing would often interrupt all remote box processing and might cause a box-level restart.

SUMMARY OF THE INVENTION

It is therefore one object of the present invention to provide an improved method of managing a computer network, particularly to obtain formatted dump data from a remote software product.

It is another object of the present invention to provide an improved method of obtaining formatted dump data that is open, using an open manager-agent relationship in a network.

It is yet another object of the present invention to provide a method of obtaining dump data that does not require large unformatted dumps to be extracted from remote sites and sent to a requester using network bandwidth.

The above as well as additional objects, features, and advantages of the present invention will become apparent in the following detailed written description.

According to one embodiment of the invention, an improved method of addressing the problems associated with traditional methodologies of selectively obtaining formatted dump data from a remote software product employs a number of new concepts. First, an open Manager-Agent concept is employed, where the Agent is represented by the remote software product and the Manager is represented by the local customer/vendor management station. Second, a dump object is defined; this object exists at the Agent and is exposed to Manager for modification, e.g., specification of a value. Third, modification of the dump object by the Manager will cause the Agent to selectively create/store a formatted storage dump for one or more of software products components. Forth, the Manager retrieves the formatted dump data from the Agent using a standard/open file transfer mechanism; since the dump data is formatted at the Agent (rather than by the receiver, i.e., manager) the problem of transmitting large amounts of data across a network is minimized or eliminated. Fifth, this method is product- and product-level independent; since the Manager and Agent interactions do not involve product-specific logic, this method can be used to selectively obtain formatted dump data from any software product, and furthermore, since the formatting is done by the Agent, there is no problem in matching the level of the format routine to the product level. Sixth, the Manager-Agent interactions are network management protocol independent. Although, in one implementation, SNMP is used, this same methodology can be employed with the Common Management Information Protocol (CMIP), SNA Management Services (SNA/NMS) or a proprietary protocol.

One of the standards organizations for standardizing computer networks is the ISO or International Standards Organization which has provided a general reference framework called the OSI or Open Systems Interconnection model. The OSI model for network management protocol is called the CMIP or Common Management Information Protocol. CMIP is more commonly used in Europe, while a related version more commonly used in the U.S. is SNMP or Simple Network Management Protocol, described in detail by Marshall T. Rose, "The Simple Book," Printice-Hall, 1991 (incorporated herein by reference). In the SNMP network management arrangement, a network management system contains a network management station, several managed nodes, each containing an agent, and a network management protocol used by the management station and the agents to exchange management information.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
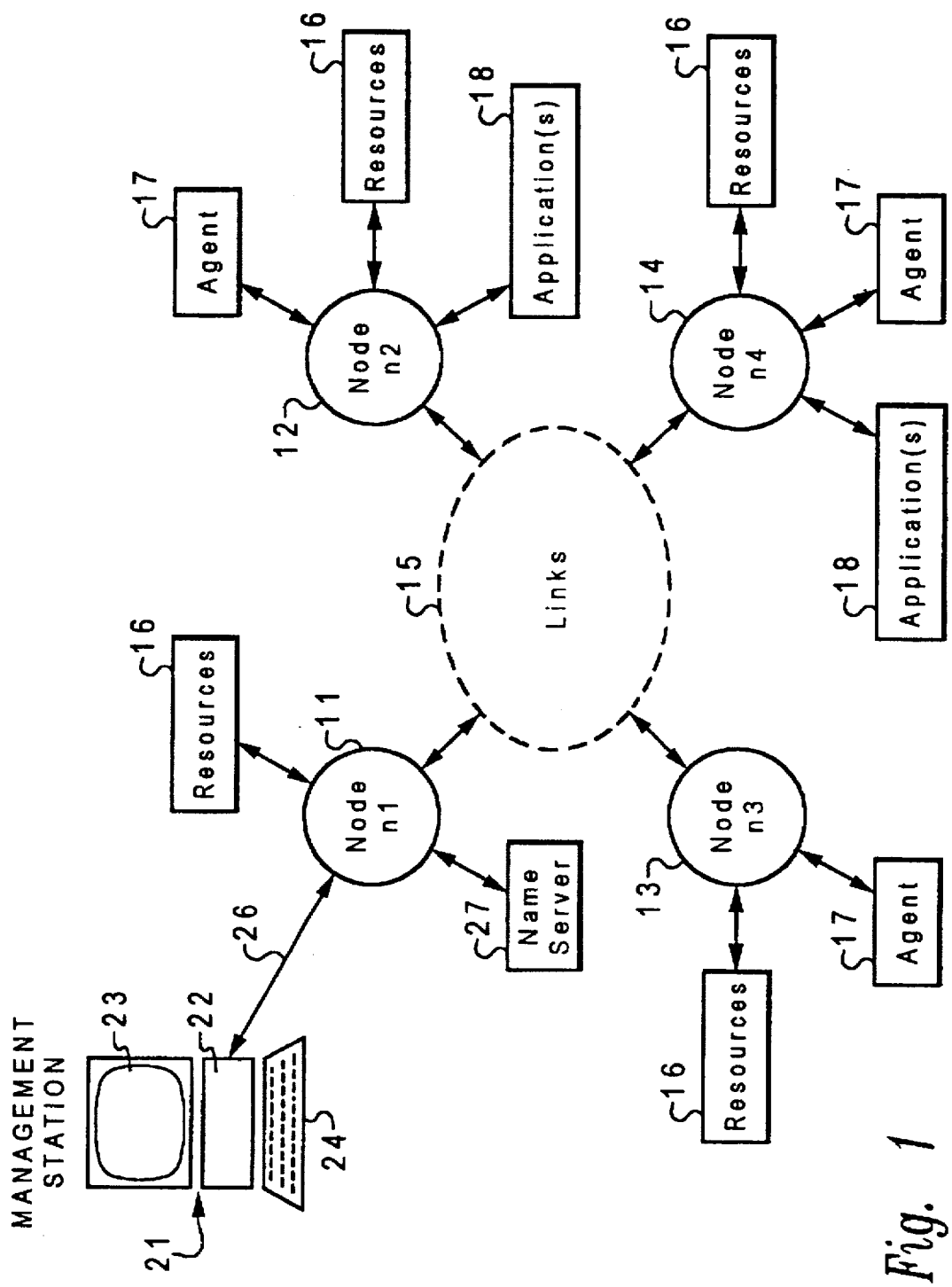
FIG. 1 is a diagram of a computer network which may use the features of one embodiment of the present invention.

Referring to FIG. 1, a network 10 is illustrated which may use features of the invention. In this example, four nodes 11, 12, 13, and 14, are illustrated in the network; these nodes are also referred to as nodes n1, n2, n3, and n4. Each node is a network device, often a computer, i.e., a data processing system which is capable of executing various tasks and processes, including that of sending messages to other nodes and responding to messages from other nodes. This network 10 may be of any one or a mixture of various network technologies, including token ring, Ethernet, point-to-point, satellite links, etc. There is usually some type of defined path or link between each node 11–14 and each one of the other nodes that is in the network, and this linkage is represented by the network link 15 of FIG. 1. The links or trunk connections 15 may be constructed using any communication medium commonly used in networks, e.g., buses between computers, telephone lines, T1 trunk connections, satellite links, or other such links. The network 10 of FIG. 1 may be what is generally termed a LAN or WAN, local area or wide area network, or combinations of LANs and WANs; the principles herein described could be used in a local area network interconnected by Ethernet or token ring technology, or others as may be suitable. Each one of the nodes 11–14 is usually connected to other nodes or terminals (workstations, desktop computers, printers, system resources, etc.), not shown, by local area networks or the like, and it is of course understood that a typical network in which the invention is useful may have a large number of nodes, spread over sites that may be local or separated by long distances.

Connected to the nodes 11–14 are various network resources 16, which may consist of printers, bulk storage facilities, processing devices, communications links to other networks, name servers, or servers of various types. These network resources are accessible by all nodes in the network, in the usual practice. Each of the nodes 11–14 and network resources 16 has status which can be reported to a manager, as by a local agent 17.

The nodes 11–14 have applications software 18 executing thereon. For example, a node 12 may have a network interface program running on it, for sending and receiving network traffic (messages) in using various protocols. In a typical situation where the retrieval of dump data may be needed, this application 18 may be functioning properly except for one of the protocols, e.g., AppleTalk, which is sending garbled messages. It would be desirable to access the memory allotted to this part of the application 18, i.e., check the contents of the main memory of the CPU of the node 12 executing the application 18, but only that part allotted to the AppleTalk functionality, to see what the control blocks (task state segments, etc.) contain. It is preferable that this be done without shutting down the application 18. The agent 17 for this node is thus able to copy specified parts of memory and format it into a file which can be transferred on the network by standard file transfer methods.

According to one feature of the invention, a management station 21 is employed, shown here connected to n1-node 11. The management station is illustrated as a workstation or computer terminal having a system unit 22, a monitor 23, and a keyboard 24. Of course, the management station 21 may be a task executing on the stone computer that executes the n1-node 11, for example. Only one management station is shown, but other nodes in the network 10 could be functioning separately as management stations. The management station 21 includes an applications program executing on a platform or general purpose processor, and has the functions of (1) executing network operator commands, i.e., those issued by a "user" or human operator, (2) communicating with the managed network 10 by messages, ordinarily using packet technology, (3) retrieving management information from other nodes, via the communication links, using messages, such as inquires and responses, (4) presenting the status and/or topology of the network in graphical form such as on the monitor 23 or by printed output, and (5) otherwise to display or present network status information. Each of these functions is performed using conventional technology which is not treated here. The information generated by the manager 21 can be made available to other management functions such as accounting, connection, performance, etc. As mentioned above, in one embodiment, the manager station uses the SNMP or Simple Network Management Protocol, described in detail by Marshall T. Rose, "The Simple Book," Printice-Hall, 1991. Software for agents 17 conforming to SNMP standards is commercially available, and agent source code is available; e.g., a source code SNMP development kit is available from M.I.T. Laboratory for Computer Science, Cambridge, Mass.

The SNMP defines a structure for a management database (a collection of objects) called the MIB Management Information Base. Objects in a MIB have names (Object Identifiers) and data structures (object types). An object identifier is a sequence of integer values which signify a path through a tree structure of numbered branches. Information is retrieved from an agent 17 by sending a SNMP Get or Get-Next request from the manager 21, with an object identification as a parameter. Data associated with an object can be altered by sending a SNMP Set request to an agent 17 with the object identification as one parameter and the data as the other parameter. As set forth in EPO patent Publ. No. 529,787 A2 dated Mar. 03, 1993 (incorporated herein by reference), the manager 21 has the capability of adding management objects to an agent 17 without requiring recompilation and without stopping and restarting the agent, and these new objects can be used by the manager 21 to initiate user-defined processes.

Thus, each one of the nodes 11–14 has a special management application called an "agent" running locally, illustrated by agents 17 in FIG. 1. The main functions supported by an agent are: (1) maintain real time management information related to the resources and networking functions of its own node, locally, (2) receive messages from and send messages to the manager station 21, (3) respond to requests for information retrieval from the manager 21, via these messages, and (4) emit unsolicited notifications (messages) when defined events such as resource or software outage occur.

The manager 21 needs to establish a connection with each agent 17 in order to exchange this information. The manager is external to the network, i.e., it could be connected to the network 10 via a communications link to one of the nodes. Thus, one of the nodes is assigned as the gateway; in FIG. 1 the n1-node 11 is the gateway for manager 21, and the path 26 can be a bus connection, or a connection by a LAN, or the like, i.e., this connection need not be direct. All communication between the manager 21 and the agents 17 must go through the gateway n1-node 11, via path 26 and the links or trunks 15; if this gateway fails, another node may be activated to take over, but there is only one gateway in a network at any one time for a given manager. Other management stations (not shown) may use the same or different nodes as gateways.

The relationship between manager 21 and agents 17 is similar to a client/server relationship where the manager 21 is the client and the agent 17 is the server. In most cases, the server is activated first and requires no client information or client presence to become operational; once it is operational, it waits to provide services to its clients. On the other hand, the client is usually activated with some information about the server and cannot perform meaningful tasks until the server is available. An agent application 17 is typically activated as part of the start-up procedure of its network node 11-14; however, it may be stopped and reactivated anytime independent of the manager 21 it also does not require any information about the manager 21. The job of the agent 17 is to make a set of supported management information available to the manager 21 on request. Configuration information such as network node address is required by the manager 21 to establish connection with each agent 17. To this end, a name server 27 or the like is available as a resource to the manager 21, as by a task operating on the n1-node 11, although it could be anywhere accessible to the manager 21 on the network. The name server 27 maintains a database of the name and address of each potentially-active node or resource on the network, and of course at any given time less than all of these nodes will be active. If a manager 21 is interested in subscribing to unsolicited notifications from agents 17, it must inform each agent 17 (obtaining the node name and address from the name server 27) giving the address of manager 21 and specifying the type of information of interest. The manager 21 should terminate its subscription when the node is no longer of interest to avoid unwanted notification messages from entering the network and thus generating loading.

Figure 2:
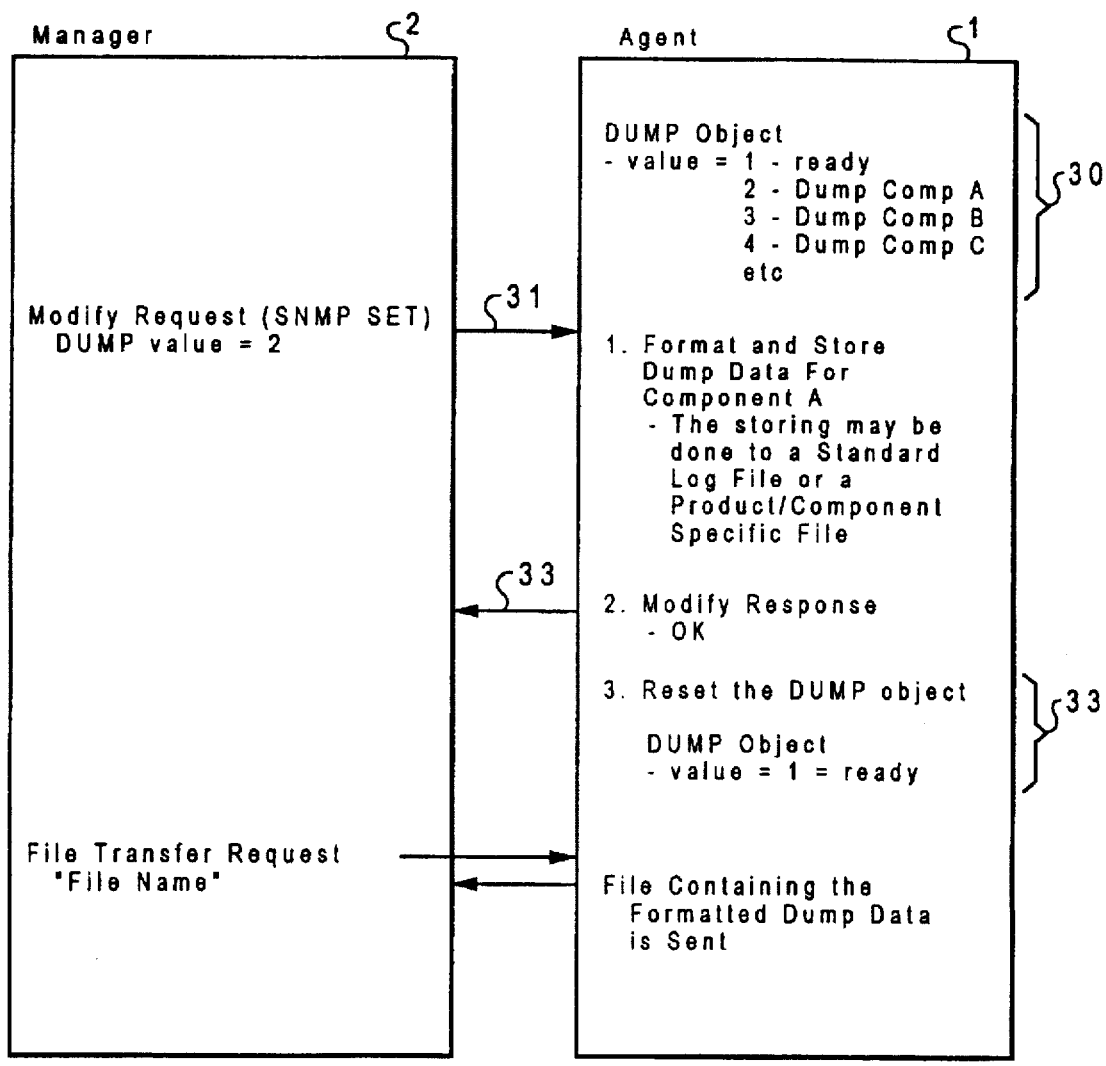
FIG. 2 is a diagram of events occurring in the manager and agent of FIG. 1 in a process used in practicing one embodiment of the invention.

According to the invention, a object which is given the title "Dump Object" is created in the agent 17. The Dump object is a conceptual trigger for the performance of an action, and it exists in the agent 17 and is retrievable/modifiable by the manager 21. Referring to FIG. 2 the Dump object 30 is implemented as an Integer with a range of possible values, e.g., 1=READY, 2=DUMP COMPONENT A, 3=DUMP COMPONENT B, etc. The agent 17 initializes this value to 1 which means the object 30 is ready to create selective dump data. Modifying the Dump object 30 to a value other than 1 will cause the agent 17 to create and store a formatted dump for the corresponding product component (e.g., the memory allocated to AppleTalk in the example above). It should be noted that this concept could be implemented by using one Dump object (one object with different values for each product component) or multiple DUMP objects (one object for each product component).

FIG. 2 illustrates the sequence of manager-agent interactions. The manger 21 may modify the value of the Dump object 30 by sending a Modify Request (indicated by the line 31), which is a SNMP Set command, setting the Dump value to 2, for example. If the value specified is within the defined component dump range, the agent 17 will create and store formatted dump data for the specified product component. The formatting routines exist at the agent and are executed in response to the request by the manager 21. Since the format routines are built as part of the product, they are always at the correct level for the product. In one embodiment, the agent 17 stores the formatted dump data to the CPU's system log data set. It should be noted that the data set could be product- or component-specific as long as the agent 17 exposes this information to the manager 21. After the creating/storing of the formatted dump data is complete, the Agent sends a Modify Response indicated by the line 32, and resets the value of the Dump object to 1 (ready), indicated at 33.

The manager 21 retrieves the formatted dump data from the agent 17 using an open/standard file transfer mechanism using a request sent to the agent a indicated by the line 34. Since the actual size of dump data to be transferred is significantly smaller than the full-product dump, the probability of successfully transferring the data set across a network is greatly increased. For example, the size of a full dump might be 20 MB and the size of one component's formatted dump data only 2K.

Figure 3:
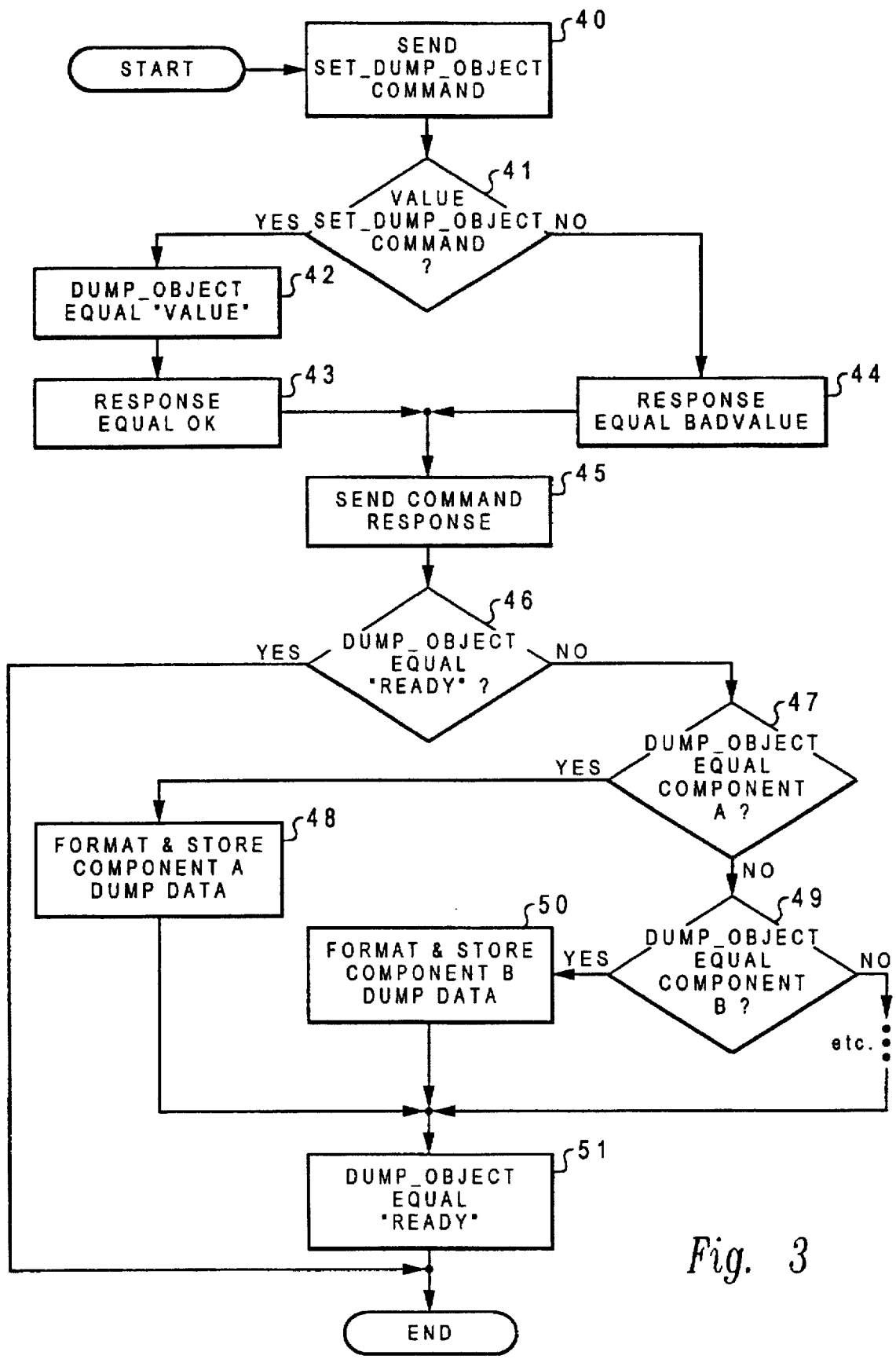

Referring to FIG. 3, the interactions of FIG. 2 are illustrated in the form of a logic flow chart. The manager 21 is executing a program according to the invention which first sends a Set_Dump_Object command, as indicated by the block 40. This command is received at the agent 17, where the Dump Object 30 is checked to see if the command is executed, indicated by the block 41. If the Dump object now has a value equal to that sent by the manager, indicated by block 42, a response of "equal" is proper, indicated by the block 43. If the value is not equal in the decision block 41, then a response of "bad value" is proper, indicated by the block 44, and the appropriate response is sent by the agent to the manager at block 45. If the command from the manager sets the Dump object 30 to a value=1 or "ready," then at decision block 46 the path goes immediately to "end" because there is no work to do. But if the value is equal to 2, or Component A, detected at block 47, then block 48 is reached, causing the agent to format and store the dump date for Component A, as indicated by the block 48. If "no" at block 47, then decision block 49 checks to see if the value is for Component B, and if so then at block 50 the agent is caused to format and store the dump date for Component B. This would continue depending upon how many components were used. When the right value is found, the Dump object is set to be equal to Ready at block 51, and the process ends.

Figure 4:
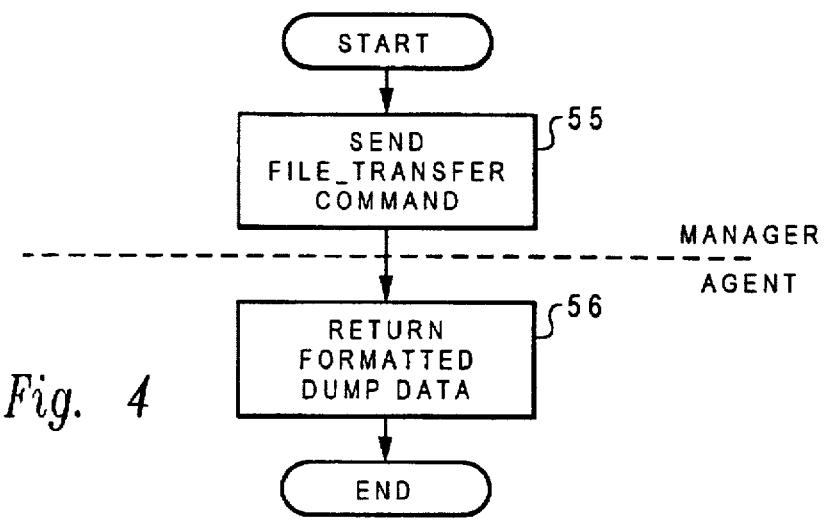
FIGS. 3 and 4 are logic flow charts of parts of the process used in practicing one embodiment of the invention, as in FIG. 2.

Referring to FIG. 4, the only remaining task is to retrieve the formatted dump data. To this end, the manager 21 sends a file transfer command to the agent 17 requesting the agent to transfer a file to the manager. This uses a standard protocol as may be suitable for the particular network. In response, the agent 17 returns the formatted dump data, indicated by the block 56, again using standard transfer protocols.

An advantage of the method described above is that it uses an "open" or standard object creation and manipulation methodology to create, store, and retrieve the formatted dump data. Another feature is that it formats the dump data at the agent rather than at the manager site. Only a very small amount of data need be stored to the dump data set. And, only a small subset of data need be transferred across the network. This method permits formatted dump data of only selected product components rather than the entire product. The method id non-disruptive to the software product and the machine it is running on (does not cause a restart). There is no manual intervention needed at the remote site (site of the agent). Also, there is no need to pre-define "problem determine tables" as has been required in some systems attempting to solve these problems.

While the invention has been particularly shown and described with reference to a preferred embodiment, it will be understood by those skilled in the art that various changes in form and detail may be made therein without departing from the spirit and scope of the invention.

What is claimed is:

1. Apparatus for managing a network and executing by data processing equipment for dynamically creating and retrieving formatted dump data, said network being of the type having a plurality of nodes coupled by connecting links, having a given process operating on said network at one of said nodes, and having an agent operating on said network at each of said nodes separate from said process, comprising:

means for sending a first command from a manager at one of said nodes to one of said agents at a different one of said nodes to set a value in a dump object in said one of said agents, said value indicating that said agent is to execute a selected command among a plurality of commands;

means for processing said dump object having said value in said one of said agents by executing the selected command to dynamically generate said formatted dump data whereby said formatted dump data becomes part of said dump object;

means for sending a second command from said manager at said one of said nodes to said one of said agents to request that said formatted dump data be sent from said dump object of said agent to said manager; and means for sending said formatted dump data from said agent to said manager.

2. Apparatus according to claim 1 wherein said means for generating is an operative part of said dump object.

3. Apparatus according to claim 2 wherein said means for sending a second command sends said second command to said dump object.

4. Apparatus according to claim 1 wherein said means for generating obtains data from said process.

5. Apparatus according to claim 1 wherein said means for sending employ a standard network management protocol manager.

6. A method for executing by data processing equipment for dynamically creating and retrieving formatted dump data in managing a network, said network being of the type having a plurality of nodes coupled by connecting links, having a given process operating on said network at one of said nodes, and having an agent operating on said network at each of said nodes separate from said process, comprising the steps of:

sending a first command from a manager at one of said nodes to one of said agents at a different one of said nodes to set a value in a dump object in said one of said agents, said value indicating that said agent is to execute a selected command among a plurality of commands;

processing said dump object having said value in said one of said agents by executing the selected command to dynamically generate said formatted dump data whereby said formatted dump data becomes part of said dump object;

sending a second command from said manager at said one of said nodes to said one of said agents to request that said formatted dump data be sent from said dump object of said agent to said manager; and sending said formatted dump data from said agent to said manager.

7. A method according to claim 6 wherein the step of generating is performed by said dump object.

8. A method according to claim 7 wherein said step of sending a second command sends said second command to said dump object.

9. A method according to claim 8 wherein the step of generating obtains data from said process.

10. A method according to claim 9 wherein said steps of sending employ a standard network management protocol.

* * * * *